Feb. 25, 1941.   O. W. CARMAN ET AL   2,233,093
OIL CLARIFIER
Filed Sept. 18, 1937
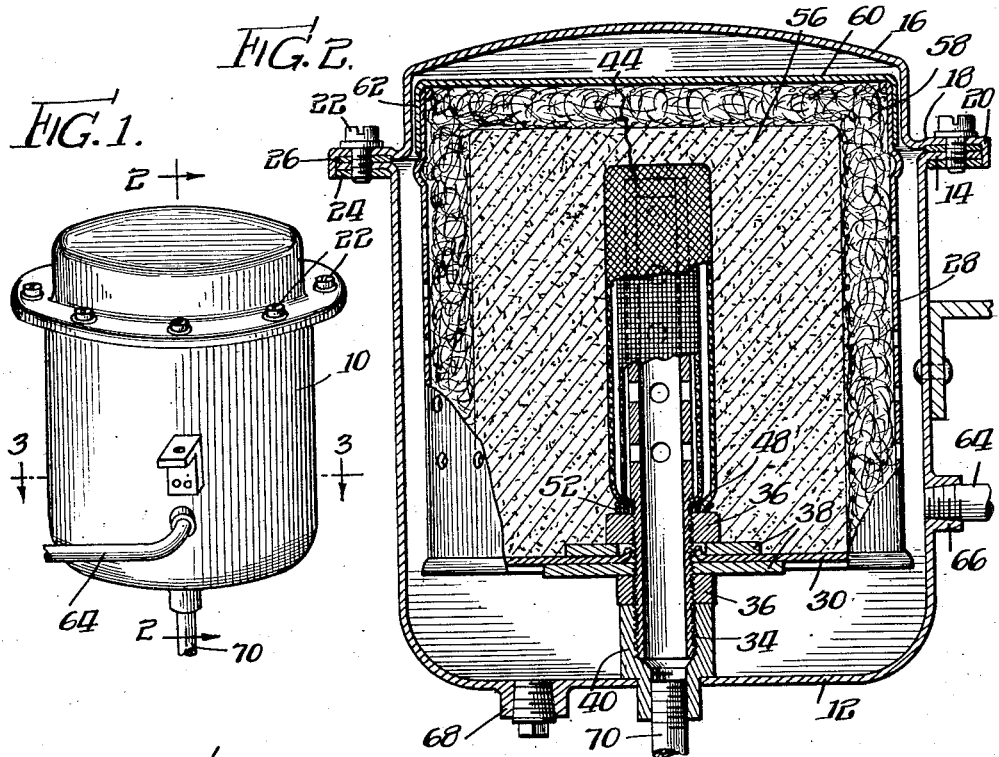
Inventors
Obe Wilton Carman
Donald Wilmer Hayden
By:- Cox & Moore  Attys.

Patented Feb. 25, 1941

2,233,093

UNITED STATES PATENT OFFICE 2,233,093

OIL CLARIFIER

Obe Wilton Carman and Donald Wilmer Hayden, Baltimore, Md., assignors to The Dushane Company, Incorporated, Detroit, Mich., a corporation of Delaware Application September 18, 1937, Serial No. 164,515

9 Claims. (Cl. 210—131)

The present invention relates to an oil filter and more particularly to a filter for use in conjunction with an internal combustion engine or the like for clarifying and purifying the oil employed in the lubricating system.

It is an object of this invention to provide a new and improved oil filter and purifier in which the filtering and purifying unit is composed of a substantially homogeneous mass of particles having the power to adsorb or absorb impurities, each particle of which is discrete in nature, the mass being supported so that each particle, though free from attachment to other particles, is maintained in adjacent relationship to provide a completely uniform filtering bed.

An additional object of this invention is to provide an oil filter which completely eliminates aqueous moisture from the oil and which at the same time removes all acids and other water soluble corrosive materials.

It is a further object of the present invention to provide a novel oil filter having a filter cartridge surrounded by an oil reservoir which is normally maintained full of unfiltered oil to a predetermined static level for the purpose of providing a substantially equal and uniform supply of oil to the filter cartridge at all points free from the influence of variable pressures and currents such as would tend to render the flow through the cartridge irregular or uneven.

A yet further object of the invention is to provide a filtering cartridge having a substantially uniform mass of a novel filtering material therein, which filtering material performs the function of removing from the oil, not only particles and foreign matter constituting normal solid impurities, but also aqueous moisture, as well as acids and other corrosive chemicals.

Still another object of this invention is to provide an improved oil filter cartridge having in combination a homogeneous filter bed composed of discrete particles free to arrange and rearrange themselves in the mass in combination with a fibrous mat to direct the oil to be filtered and distribute it uniformly into the filter bed in such a manner as not to pack the filter, as well as to form the bed of filter material into a unitary mass of particles free from voids.

Yet another object of the invention is to provide an improved filter which may be readily attached to an automotive vehicle and in which the filter cartridge may be removed and replaced with a minimum of effort and difficulty.

Numerous other objects and advantages will more fully appear during the course and progress of the following specification.

Figure 1 is a perspective elevation of a filter made in accordance with the present invention.

Figure 2 is a sectional elevation taken on the line 2—2 in Figure 1.

Figure 3 is a sectional view taken on the line 3—3 in Figure 1.

Figure 4 is a perspective view of the filter cartridge removed from the filter.

The device, shown for the purpose of illustrating the present invention, comprising an exterior casing 10 cylindrical in shape, closed at the bottom by a wall 12 and terminating at the upper edge in an annular flange 14. The casing is normally closed at its upper end by the cover member 16 provided with a corresponding flange 18 adapted to register with the flange 14 and having at its edge the downwardly projecting annular rim 20. A plurality of machine screws 22 pass through apertures in the flange 18 and are threaded into the lower flange 14 and the annular ring 24 to maintain the cover in assembled relationship. A suitable gasket 26 of cork or other equivalent material serves to hermetically seal the closure.

Interiorly of the casing the filter is provided with a filter cartridge containing the actual filter bed which is so constructed and arranged as to permit ready removal and replacement at any time the clarifying power of the filter becomes weakened or exhausted. This cartridge comprises a metal can having a cylindrical wall 28 and a bottom wall 30 which is punched at its central portion to provide a circular aperture for accommodating a central tube 32 which forms a well for the purpose of collecting and conveying off the filtered and clarified oil.

The tube 32 serves further to support the can 28 and its contents, to be hereinafter described, with respect to the remainder of the filter. The tube is threaded adjacent its lower end 34 to receive a pair of opposed nuts 36, one situated on either side of the bottom 30 of the can for rigidly clamping the said bottom wall therebetween. Large washers 38 serve to distribute the force and render the support extremely rigid. The bottom wall of the casing 12 is centrally provided with a sleeve 40 which is provided with screw threads to accommodate the thread 34 on the end of the tube 32. Accordingly, when the tube 32 is screwed into the sleeve 40 in the manner indicated in Figure 2, the cartridge is firmly and rigidly supported with respect to the outer casing but may be readily removed and disassembled when the top 16 is removed by merely rotating the cartridge in a direction opposite to that of the thread 34.

The wall of the tube 32 is, throughout the upper portion of its length, as viewed in Figure 2, provided with a plurality of apertures 42 and the upper end thereof is preferably sealed off by a plug 44 of any suitable material, such as metal or wood, for example.

The portion of the tube 32 extending into the interior of the can 28 is completely surrounded by a sleeve 46 of screening material. In the preferred embodiment a 100-mesh copper or bronze screen is employed although it will be apparent that substantially any non-reactive screening material may be used, while the size of the apertures may vary within wide ranges. According to one method of mounting the sleeve 46 in position there is employed a wire loop 48 tensioned about the end thereof.

Exteriorly of the screen is a second sleeve 50 of suitable textile material which is closed at its end and surrounds the screen 46. This sleeve is similarly maintained in place by a loop of cord or wire 52 at its lower end, as viewed in Figure 2. This element of the structure suitably retains the interior filtering bed and produces a final separation of the oil which is being filtered. Various textile fabrics have been employed in this relationship but immensely superior results have been secured with hard cotton fabrics, such as cretonne. It is conceived that these greatly superior results are due to the hardness and cleanness of the fibres. Thus, for example, various other fibres are characterized by a relatively soft surface having a multitude of fine hairs which it is believed tend to cause a clogging action. In employing cretonne in the present structure, however, the oil readily passes through the material while there is no tendency for the material from the filter bed to accumulate and back against the surface of the fabric. In the present structure the filter bed is always maintained loose adjacent the textile sleeve 50 with the result that the oil is free also to run downwardly along the inner and outer surfaces thereof to produce a washing action and keep the surfaces clear.

The cylindrical wall 28 of the cartridge is provided with a multitude of small apertures 54, as indicated more fully in Figures 3 and 4. These apertures are spaced from the bottom and top of the cartridge a relatively great distance to prevent the formation of channels adjacent these portions of the device.

Interiorly the cartridge is supplied with a body of pulverulent filtering material 56 which performs the filtering function. The entire bed is made up of discrete individual particles of a suitable absorbent or adsorbent material which will remove the impurities and properly clarify the oil handled by the filter. More specifically, in accordance with the present invention, it is preferred that the filter bed comprise mainly an absorbent or adsorbent earth, such as fuller's earth. It is undesirable to employ material of a particle size which is so extremely fine as to tend to separate from the remainder of the mass or to flow with the oil being filtered. Moreover extremely fine material will tend to compact and prevent the passage of the substance to be filtered. On the other hand, it will be apparent from this disclosure that the employment of extremely large particles will interfere with the purifying and clarifying effect of the material. According to the preferred embodiment, the fuller's earth employed in the filter bed consists of particles, all of which pass a 30-mesh screen and are retained by a 60-mesh screen. It will be apparent, however, that the particle sizes may vary within a considerable range.

The present invention provides for the treatment of the oil to remove any aqueous components, together with acids or other reagents, which are generally associated with or soluble in water. To this end there is mixed uniformly into the filter bed a proportion of some suitable water-absorbing or adsorbing, particulate material. Various substances are useful in this relationship including silica jell, for example. Exceedingly good results have been achieved employing granular, activated alumina, a small proportion of which is uniformly distributed throughout the filter bed to form a generally homogeneous mass. Here, however, though the size of the particles may vary within a relatively wide range, in the preferred embodiment all the alumina particles are retained upon a 60-mesh screen and pass a 20-mesh screen. According to one preferred form of the invention the mass of filter material 56 comprises a very intimate mixture of 30 ounces of the above described fuller's earth and 3 ounces of the activated alumina. These proportions may be varied according to the particular service to which the device is to be put.

In order to completely and uniformly distribute the incoming oil to the filter bed, as well as remove the coarser particles, there is provided a fibrous layer 58 extending adjacent the side wall 28 of the cartridge and interiorly of the apertures 54. The layer 58 comprises a high grade cotton waste free from balls of matted material or lint and particularly from imperfections such as rags and foreign materials. In other words, this layer should consist of cotton fibres as pure and uncontaminated as possible and must be firmly pressed in place in order to provide a uniform oil-distributing layer. The layer 58 likewise preferably extends across the top of the mass of filtering material 56 for reasons which will hereinafter appear.

In loading the cartridge, after the central tube together with the screen 46 and the textile sleeve 50 have been completely assembled, a removable tube having a diameter substantially equal to that indicated by the line of demarcation between the body of particulate material 56 and the layer of waste 58 is inserted into the cartridge and the waste inserted and packed uniformly thereabout. Then, the thoroughly mixed and graded particles forming the filter bed 56 are inserted into the interior of the tube and uniformly packed to assure a homogeneous freedom from voids. When the body of material 56 is completely loaded, the tube may be withdrawn and the top layer of waste 58 placed thereover. The entire unit is maintained in assembled relationship by the metal cover 60 which has an annular, downwardly projecting flange 62 which tightly engages about the upper edge of the wall 28.

While the mass of material 56 is composed of relatively loose, discrete particles, nevertheless it will be apparent that in service there will be a natural tendency, due to jarring and vibration, for the particles to settle closely together. In order to prevent this and maintain a uniformity in filtering characteristics, it has been found preferable to assure that the filtering bed is well packed, that is, by initially jarring the particles during loading or by applying a firm pressure, as by means of a press or the like. This packing step, however, must in any event be insufficient to destroy the particulate and relatively loose character of the material since one of the main purposes of the present invention seeks to avoid the difficulties inherent in the prior structures which conventionally employ a filtering bed of fuller's earth and the like which is baked, bonded or otherwise pressed or formed into a relatively solid structure. The layer of waste 58 being formed under some pressure also serves to properly support the mass of particles. Thus, for example, the layer of waste may be formed with the assistance of a small mechanical press. According to the preferred form of the invention the said layer may be in the neighborhood of half an inch in thickness.

In use, the incoming oil is supplied through the tube 64 which is threaded into the boss 66 on the side wall 10 of the casing. It is extremely important that this inlet be located in the position shown in Figure 2 and opposite a portion of the wall 28 which is free from the apertures 54. Thus it will be apparent that the incoming stream of impure oil is below the points at which the oil flows into the cartridge to be filtered.

In operation, the filtering action is completely uniform and the cartridge is supplied by oil at an equal pressure in all directions, free from currents due to the feed conduit. For example, the oil entering through the tube 64 first fills the space in the bottom of the casing 10 below the lowermost line of apertures 54. The cartridge is spaced a relatively great distance from the bottom wall 12 of the casing in order to provide a space for the accumulation of settlings which may be removed through the drain plug 68. As feeding of the impure oil progresses, the level thereof rises uniformly in the casing about the series of apertures 54. In other words, the oil in the casing is at all times at a uniform static level about the cartridge, wherefore the supply thereto is uniform in all directions. In many of the prior art devices direction of the incoming flow onto certain portions of the filter element induces irregularity of action and tends to set up channeling. This difficulty has been obviated completely by the present structure.

The filtered oil passes through the sleeve of textile material 50 and the screen 46 and thence through the apertures 42 into the central tube 32. The filtered oil is drawn off through the outlet tube 76 threaded into the lower end of the sleeve 40.

The device may be suitably supported in any desired manner, preferably by a bracket attached to the casing or by means of a strap passing around the wall 10 and suitably supported on the engine or other device. Having so supported the filter and once connected the inlet tube and the outlet tube, the assembly becomes permanent in nature. Should the filter bed become exhausted after a severe period of use, it may be replaced in a very simple manner. First, the machine screws 22 are withdrawn whereupon the cover 16 of the casing may be removed and the entire cartridge taken out of the casing by grasping its upper edge and rotating it in such a direction as to unscrew the tube 32 from the sleeve 40. A renewal cartridge is then inserted in the same position and firmly screwed down into place after which the cover 16 is replaced and the screws 22 tightened.

The present device furnishes a novel and improved unit which operates to remove from lubricating oil those impurities which are highly detrimental to the operation of the modern engine. Thus the fuller's earth component, not only clarifies the oil and removes the particles of carbon, dust and metal resulting from wear of the moving parts, but also extracts moisture and corrosive components. It is well known that through condensation and other means lubricating oil, particularly in an internal combustion engine, frequently accumulates a proportion of moisture which is highly detrimental to the operation of the device. This impurity is completely removed by the activated alumina or equivalent absorbent material. So, also, are the acids or other corrosive materials which are soluble in the moisture and which are taken up in the filter bed.

Moreover, in operation, the device is more than a mere reservoir for impurities of this kind which are known to occur in detrimental proportions only at certain times during the operation of the device. Thus, for example, when an engine has been operating for some time under load conditions, the oil becomes heated to an elevated temperature, as a result of which the moisture accumulated by the device when the oil was relatively cool, is believed to be dissipated by the heat and released in harmless gaseous form to the external atmosphere. Accordingly the filter is again able to completely remove any further accumulation of moisture in the oil under any subsequent moisture-forming conditions.

The instant oil filter likewise obviates the numerous difficulties inherent in the use of previously bonded or baked filter elements. When a mass of fuller's earth is baked there is a unitary filter element; for example, the passages for the oil become fixed and well defined. On the other hand, employing a relatively loose mass of particles, as in the present device, there is no fixed passage but the oil is free to move about the granules in any direction. Since the mass is uniformly supported in all directions, there is no preferential path of travel for the fluid and the result is a uniformity of filtering action which is dependent in large measure upon the uniform layer of packed, high grade cotton waste which initially distributes the incoming oil and removes any coarser particles.

It is conceived that the improved results of the present device are due in large measure to the fact that the particles do not remain fixed but in effect float in the oil and, under the influence of the flow thereof and/or the normal vibration of the device when in use, tend to move and turn over, exposing all surfaces, not only to produce a highly improved clarifying action, but to maintain clean surfaces between the boundaries of the particulate mass and the cretonne sleeve 50. The uniformity of the filtering action is, of course, enhanced by the aforementioned disposition of the inlet conduit which serves at all times to immerse the cartridge under substantially static conditions in a uniform body of impure oil.

Moreover, the placing of the inlet conduit 64 at a relatively low level assists the initial settling of the larger particles of impurities and sludge. For example, the incoming stream, initially impinging upon an utterly blank section of the wall 28 of the cartridge, is caused to change its direction and thus is influenced to drop any suspended matter it may contain. A large portion of the flow necessarily passes into the relatively large chamber beneath the cartridge wherein the rate of movement is immediately reduced to an extremely low figure favorable for clarification and separation.

Subsequently the body of oil moves upwardly about the cartridge, immersing it in impure oil uniformly upon all sides. Since the wall 28 is normally upstanding with respect to the horizontal, it is impossible for any sludge or impurities to collect thereon and clog the apertures

54. This fact holds true whether the device be employed in a tilted or vertical position.

In order to prevent trituration of the particles and the formation of fine dust which will hinder the operation of the device, the filter is initially supplied with a small amount of spindle oil which cushions the granules during shipping and before placed in service in the manner described above.

It is thought that the invention and numerous of its attendant advantages will be understood from the foregoing description and it is obvious that numerous changes may be made in the form, construction and arrangement of the several parts without departing from the spirit or scope of the invention, or sacrificing any of its attendant advantages, the form herein described being a preferred embodiment for the purpose of illustrating the invention.

The invention is hereby claimed as follows:

1. An oil filter comprising a filter bed consisting of a loose, particulate body of solid granules of material which adsorb or absorb impurities from the oil, said particles comprising a mixture of fuller's earth and a second activated agent of the class consisting of silica jell and activated alumina.

2. An oil filter comprising a filter bed consisting of a loose, particulate body of solid granules of material which adsorb or absorb impurities from the oil, said particles comprising a mixture of fuller's earth and activated alumina.

3. An oil filter comprising a container having spaced, generally upstanding side retaining walls defining an interior space between said side retaining walls, oil inlet means in one of said walls adapted to admit the supply of oil laterally to said interior space, and oil outlet means in the other of said walls spaced from said inlet means for permitting egress of oil from the said interior space, said inlet and outlet means being arranged in substantially the same horizontal plane and said interior space containing therein a body of loose, particulate, adsorbent material disposed between said inlet and outlet means whereby oil passing from said inlet to said outlet means passes substantially horizontally through a relatively loose mass of adsorbent material free from channels, said particles comprising a mixture of fuller's earth and a second activated agent of the class consisting of silica jell and activated alumina.

4. An oil filter comprising a casing, a filter cartridge interiorly of said casing and spaced upwardly above the bottom of the casing to provide a sediment space and having an upstanding wall provided with apertures therein, said wall having an imperforate portion adjacent its lower extremity, a bed of filter material within said cartridge, said filter material comprising a loose, particulate body of granules comprising a mixture of fuller's earth and activated alumina, a well for clarified oil interiorly of the cartridge and having means to admit and collect oil passing through the filter bed, inlet means in said casing and positioned opposite said upstanding wall but at a relatively low point below the level of said apertures to supply the oil thereto and immerse the cartridge therein to a uniform static level on all sides, and means to withdraw oil from said well whereby the oil is supplied laterally to said apertures while free of any currents adapted to cause preferential channeling.

5. An oil filter comprising a filter bed consisting of a relatively loose, particulate body of solid granules of materials which adsorb or absorb impurities from the oil, said body of particles comprising an intimate admixture of a granular adsorbent oil clarifying earth with a second granular, highly activated, moisture-adsorbing agent, of the class consisting of silica jell and activated alumina.

6. In a filtering device of the class described comprising a cartridge adapted to be immersed in a body of oil and to receive oil from said body for filtering purposes, said cartridge comprising an upstanding exterior wall having inlet means therein for admitting oil to the interior of the cartridge, an oil collecting member positioned within said exterior wall and spaced therefrom, said oil collecting member being in substantial horizontal alignment with said inlet means, and a filter bed located in the space between said wall and said oil collecting member and comprising a mass of discrete, granular particles of adsorbent material, said mass of adsorbent material being free from bonding or interadherence of the particles whereby oil to be clarified is free to pass substantially horizontally from the inlet to the outlet through said bed of adsorbent material while being presented with substantially equal resistance to flow in all directions in any horizontal plane to prevent channeling, said particles comprising a mixture of fuller's earth and a second activated agent of the class consisting of silica jell and activated alumina.

7. An oil filter comprising a tank, an inlet for said tank, a substantially rigidly formed canister in the tank having upstanding substantially vertical walls, canister inlet apertures in said walls, a well in the said canister for the accumulation of the filtered oil, said well having upstanding substantially vertical walls with outlet apertures therein, the apertures in said wall of the well being offset horizontally with respect to said canister inlet apertures, and a body of loose, particulate fuller's earth containing a substantial intimate admixture of particles of activated alumina in the space between said apertures whereby to cause a horizontal flow of oil through the loose body of particulate grains.

8. The process for filtering oil to remove impurities including moisture, acids and the like, which comprises passing the oil through a substantially loose, particulate mass of particles of fuller's earth, said particles containing uniformly distributed therebetween particles of activated alumina in substantial quantity.

9. An oil filter comprising a canister adapted to form a container for a filter bed, said canister having outer side walls with oil inlet means formed therein, a well interiorly of said canister for the accumulation of filtered oil, said well having means to admit oil from the filter bed, the space between said inlet means and said outlet means containing a filter bed comprising particles of fuller's earth through which the oil must pass in moving from the inlet means to the outlet means, said body of fuller's earth having an intimate admixture therewith of particles of activated alumina in substantial quantity.

OBE WILTON CARMAN.
DONALD WILMER HAYDEN.